Figure 1:
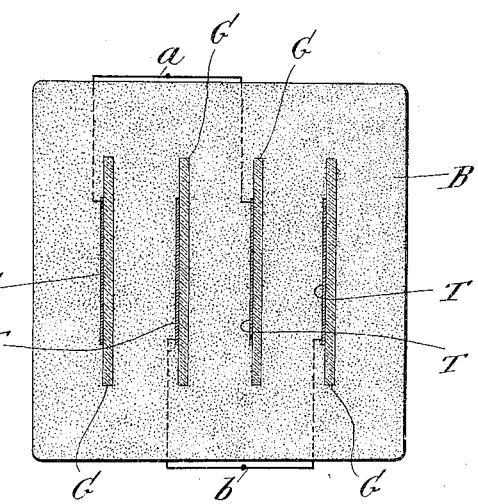

J. S. STONE.
CONDENSER.
APPLICATION FILED DEC. 28, 1905.

908,814.

Patented Jan. 5, 1909.

WITNESSES=
Georgia A. Higgins
George H. Clark

INVENTOR=
John Stone Stone
by Alex. P. Browne
attorney

UNITED STATES PATENT OFFICE.

JOHN STONE STONE, OF CAMBRIDGE, MASSACHUSETTS.

CONDENSER.

No. 908,814.     Specification of Letters Patent.     Patented Jan. 5, 1909.

Application filed December 28, 1905. Serial No. 293,610.

*To all whom it may concern:*

Be it known that I, JOHN STONE STONE, a citizen of the United States, and a resident of Cambridge, in the county of Middlesex and State of Massachusetts, have invented a new and useful Improvement in Condensers, of which the following is a specification.

My invention relates to electrical condensers, and it relates more especially to those condensers which are employed in wireless telegraph transmitting systems and which are subjected to electrical oscillations of high frequency and high potential.

Condensers as usually constructed consist of conducting surfaces separated by solid dielectrics, such dielectrics being chosen with respect to their dielectric strengths and their specific inductive capacities. It has long been recognized that such solid dielectrics possess an electrical property which corresponds to the mechanical property of imperfect elasticity. This property of solid dielectrics in condensers produces the phenomenon known as dielectric hysteresis, by which a portion of the electrical energy of every charge stored in the condenser is absorbed and converted into heat. It may also result in the distortion of the waveform of an alternating current traversing such condenser and generally produces marked diminution in the phenomenon of resonance when such condensers are used to tune resonant circuits as first determined by Dr. Louis Duncan in a series of experiments, some of the results of which were set forth in the *Transactions of the American Institute of Electrical Engineers*, Vol. IX, June 6, 1892. It has also long been known that if air or any elementary gas be substituted for the solid dielectric in the condenser, these gases having practically perfect mechanical elasticity, the resulting condenser does not possess dielectric hysteresis, does not cause a dissipation of any appreciable portion of the electric energy of a charge stored in the condenser, does not distort an alternating current traversing the condenser and does not diminish the phenomena of resonance when it is used as a tuning element of a resonant circuit. However, air and other gases have small dielectric strengths and small specific inductive capacities as compared to the dielectric strengths and specific inductive capacities of the solid materials usually employed as dielectrics in condensers. Therefore an air condenser having a given capacity and therefore capable of storing a given amount of energy is in general much greater in cubical contents than the corresponding condenser with a solid dielectric.

The object of the present invention is to produce an electrical condenser in which the cubical contents for a given capacity shall be much smaller than in an air condenser, and which shall have as near as may be the same electrical properties as such air condenser.

In my U. S. Letters Patent No. 767,977, dated Aug. 16, 1904, I have disclosed one means for carrying out the hereinbefore stated objects, namely, a condenser having a dielectric of fused quartz glass which has a high degree of dielectric strength and practically perfect electrical elasticity. In the present case, however, I accomplish said objects more economically by employing two dielectrics, one of which has a high degree of dielectric strength and relatively imperfect electrical elasticity, such for example as glass, and the other of which has relatively low dielectric strength and relatively perfect electrical elasticity, such for example as air or a mixture of bees-wax and rosin.

Figure 2:
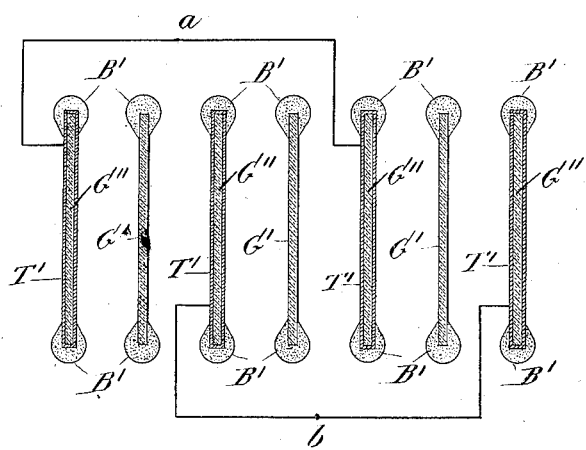

In the drawings which accompany and form a part of this specification and which show two of the numerous forms which my invention may take, Figure 1 shows in vertical section a condenser having two solid dielectrics, and Fig. 2 shows in vertical a condenser having one solid and one gaseous dielectric.

In Fig. 1 G G represent plates of glass of any suitable thickness, for example, from $\frac{1}{10}$ inch to $\frac{1}{8}$ inch, and T T represent metallic members or conducting surfaces, each in contact with one side of its glass plate. The alternate metallic members T T are conductively connected by suitable conductors which are brought out to the points *a* and *b* respectively. The plates G G with their conducting members T T are suitably spaced apart in a receptacle, preferably by distances several times greater than the thickness of said plates, and a mixture of beeswax and rosin, preferably in equal parts, is poured into the receptacle and completely incloses the plates and conducting members. It will be observed that the dielectric strength of the condenser so formed is due very largely to the glass plates G G, while the electrical elasticity, or the energy-storing factor, is due very largely to the beeswax and rosin mixture which as before stated possesses relatively perfect electrical elasticity for oscillations of the high frequency employed in wireless telegraphy. In fact, this mixture of bees-wax and rosin has a much more perfect electrical elasticity for such oscillations than most other materials which are practicable for the purpose. I have heretofore employed condensers the dielectrics of which consisted of bees-wax and rosin, and have found that there is, even for the high-frequency oscillations employed in wireless telegraphy, relatively little absorption of the energy of such oscillations by said dielectric; but, on account of the relatively low dielectric strength of said bees-wax and rosin, there is a limitation to the potential difference which may be impressed upon the terminals of such condensers. It will be observed that by employing the double dielectric herein disclosed such limitation may be overcome without impairing the electrical elasticity of the condenser as a whole or introducing to any marked degree the defects of dielectric hysteresis.

Fig. 2 shows a condenser which embodies the same principles as the condenser illustrated in Fig. 1. In Fig. 2, G'' G'' are supports of glass or other material, for example sheet iron, and T' T' are metallic members or conducting surfaces supported by the plates G'' G'', and are in contact therewith throughout the entire extent thereof so that if said supports be of glass or other insulating material, the dielectric qualities of said supports do not enter into the operation of the condenser. G' G' are plates of glass or other dielectric material of relatively high dielectric strength and relatively imperfect electrical elasticity, corresponding to the plates G G in Fig. 1, and the dielectric of relatively low dielectric strength and relatively perfect electrical elasticity, corresponding to the bees-wax and rosin mixture B of Fig. 1, is the air which fills the spaces between the conducting members T' T'. The alternate members T' T' are conductively connected by suitable conductors which are brought out to the points $a$ $b$ respectively. The edges of all the plates G' and G'' are dipped into a mixture of bees-wax and rosin so as to form insulating members of relatively large radius of curvature for the purpose of preventing surface leakage and brush discharges from one plate to another.

In the condenser shown in Fig. 2, the dielectric strength depends largely upon the glass plates G' G', while the electrical elasticity depends largely upon the air between the conducting surfaces T' T'.

It is to be understood that I do not limit myself to the particular form of condenser shown in the drawing, or to the particular materials herein set forth as constituting such condenser, for it is obvious that many other forms of condenser and many other materials for constructing the same may readily be devised by those skilled in the art without departing from the spirit of my invention.

I claim,

1. A condenser comprising two dielectrics, one having a high degree of dielectric strength and the other having relatively perfect electrical elasticity.

2. A condenser comprising two dielectrics, one having a high degree of dielectric strength and relatively imperfect electrical elasticity, and the other having relatively low dielectric strength and relatively perfect electrical elasticity.

3. A condenser comprising two solid dielectrics, one having a high degree of dielectric strength and the other having practically perfect electrical elasticity.

4. A condenser comprising two dielectrics, one of which is glass and the other of which is a mixture of bees-wax and rosin.

5. In a condenser, a dielectric having relatively perfect electrical elasticity, a member having a high degree of dielectric strength embedded in said dielectric, and a metallic member in contact with said member.

6. In a condenser, a dielectric having relatively perfect electrical elasticity, a plurality of members of large dielectric strength embedded in said dielectric, metallic members in contact respectively with said members, and means electrically connecting the alternate metallic members.

7. A condenser comprising two dielectrics of unequal electrical elasticity, the dielectric having the more perfect electrical elasticity being thicker than the other.

8. A condenser comprising two dielectrics of unequal dielectric strength, the dielectric having the higher dielectric strength being thinner than the other.

9. A condenser comprising plates, the edges of which are provided with members having relatively large radius of curvature to prevent surface leakage and brush discharge.

10. A condenser comprising two dielectrics, one having a high degree of dielectric strength and the other having relatively perfect electrical elasticity, the dielectric having the high degree of dielectric strength being thinner than the other.

11. A condenser comprising two dielectrics, one having a high degree of dielectric strength and relatively imperfect electrical elasticity, and the other having relatively low dielectric strength and relatively perfect electrical elasticity, the dielectric having the high degree of dielectric strength being thinner than the other.

In testimony whereof, I have hereunto subscribed my name this 27th day of Dec. 1905.

JOHN STONE STONE.

Witnesses:
  E. B. TOMLINSON,
  GEO. K. WOODWORTH.